United States Patent [19]

von Ballmoos

[11] 4,103,150

[45] Jul. 25, 1978

[54] ARRANGEMENT FOR CONTROLLING THE ACCESS TO AN ESTABLISHMENT AND ENTRY CARD SUITABLE FOR SUCH AN ARRANGEMENT

[75] Inventor: Fritz von Ballmoos, Horgen, Switzerland

[73] Assignee: Guhl & Scheibler AG, Aesch, Switzerland; a part interest

[21] Appl. No.: 664,312

[22] Filed: Mar. 5, 1976

[30] Foreign Application Priority Data

Mar. 10, 1975 [CH] Switzerland ............... 2987/75
Feb. 19, 1976 [CH] Switzerland ............... 2017/76

[51] Int. Cl.² ............ G06K 5/00; G06K 7/14; G06K 19/06
[52] U.S. Cl. ............... 235/419; 235/454; 235/487
[58] Field of Search ............ 235/61.7 R, 61.7 B, 235/61.6, 61.11 E, 61.12 N; 200/46; 340/51

[56] References Cited

U.S. PATENT DOCUMENTS

| | | | |
|---|---|---|---|
| 2,704,634 | 3/1955 | Rauch | 235/61.12 N |
| 2,735,617 | 2/1956 | Knutsen | 235/61.12 N |
| 3,558,859 | 1/1971 | Dilsner et al. | 235/61.12 N |
| 3,737,628 | 6/1973 | Azure, Jr. | 235/61.12 N |
| 3,829,661 | 8/1974 | Silverman et al. | 235/61.7 B |
| 3,926,021 | 12/1975 | Genest et al. | 235/61.7 B |
| 3,984,658 | 10/1976 | Cannon | 235/61.7 B |

*Primary Examiner*—Daryl W. Cook
*Attorney, Agent, or Firm*—Toren, McGeady and Stanger

[57] ABSTRACT

Apparatus for the control of admission to an establishment includes a suitable, coded entry card and a device for reading the card and providing entry when appropriate. The card includes a first region having machine-readable information encoded thereon prior to issue. The device contains at least one reader and an electronic control mechanism for examining the information read and for providing entry if the information read coincides with a preset comparison value. A further region is preferably included on the card with a value field to be cancelled. The device then contains a second reader to determine the validity of the value field. The second reader preferably functions by use of a light source and sensor. Thermographic material may be included on the card containing the cancellable value field and the device then contains a canceller.

19 Claims, 5 Drawing Figures

ARRANGEMENT FOR CONTROLLING THE ACCESS TO AN ESTABLISHMENT AND ENTRY CARD SUITABLE FOR SUCH AN ARRANGEMENT

FIELD OF THE INVENTION

The present invention relates to an apparatus for the entry control of an establishment and an entry card suitable therefor.

BACKGROUND OF THE INVENTION

Devices of this kind are used particularly for transport installations and leisure-time establishments, such as for example, ski lifts, cable cars or bathing establishments. The entry card customarily includes a plurality of value-fields or locations, which are successively printed along the longitudinal direction of the entry card. The valid date or the location of the canceller, can, for example, be stamped onto one or several of the value-fields for cancellation. So that the fields or locations are cancelled in the correct sequence, and to avoid a multiple cancellation of the same field or location, if at all possible. It is already known to cut off part of a lateral edge of the entry card concurrently with the cancellation thereof. The cut-off portion is then used as a stop gauge during the next insertion of the card into a canceller. A cancellation device is also known for multiply-usable tickets or entry cards which employs additional means to recognize an entry card, the value fields of which having already been cancelled, or which no longer contains a sufficient amount of value fields for entry into an establishment requiring a plurality of value fields. A portion of the lateral edge of the entry card is also cut off in this device concurrently with the stamping of a cancellation stamp thereon, the length of the cut-off portion corresponding to the number of cancellation imprints. This device determines whether the lateral edge to be cut off still has the required length to be removed, for recognition of completely cancelled entry cards, or entry cards having an insufficient number of valid fields. A mechanical feeler is used therefor. If the ticket has already been cancelled, i.e. if all prerequisite portions have already been cut off, or if the edge of the card is shorter than the length of the portion required to be cut off for the preset cancellation, then the feeler blocks the cancellation device.

These known devices have disadvantages which strongly limit their use. The devices require mechanically movable parts, which are subject to malfunction, for cutting off the lateral edge and for guidance of that length of the edge portion which has not been cut off. This applies particularly for devices which are installed in the open air. Furthermore there occurs a material waste during cut off of the lateral portion, the latter being required to be removed by an operator during relatively short time periods in an establishment having a high frequency of usage. The entry card can generally be simulated by a piece of paper or cardboard of equal dimensions, so that establishments of this kind are not suitable for fully automatic operation, but require ticket control by supervisory persons. Finally, an entry card can only contain a limited number of value fields, since the segments on the lateral edge must be relatively long for the mechanical feeling thereof, whereas the whole length of the entry card or ticket is limited due to practical reasons.

It is therefore an object of the present invention to create a device of the aforesaid kind, and an entry card or ticket suitable therefor which obviates the above-named disadvantages.

The device and entry card according to the invention is characterized by the entry card including at least a first region for the entry of machine-readable information prior to issue of the card, and by the device containing at least one reader, provided for reading the information, as well as an electronic control mechanism, which examines the read information and which permits entry to the establishment if the information coincides with a preset comparison value.

The entry card or ticket preferably includes a further region with at least one value field to be cancelled, and the device contains a second reader provided to determine the validity of the at least one value field, the second reader including at least one light source for the illumination of at least a small region of the entry card or ticket, and an associated light sensor for receiving the light reflected from the illuminated region of the entry card or ticket.

In a preferred implementation version, the entry card includes thermographic material at least in the region containing the at least one cancellable value field, and the device contains a canceller for the cancellation of the at least one value field, the canceller containing at least one heating device for blackening of the thermographic material in a small region, by means of heat rays and/or heat conduction.

In still another preferred implementation version, the canceller and the second reader are disposed so that the cancellation of the at least one value field on the thermographic material is readable by the second reader, and the signal generated by the second reader is usable for control of the canceller.

The new device and the entry card or ticket provided therefor ensures a safe operation with minimal maintainence and an optimal automatic control, so that the employment or use of supervising- or maintainence-personnel can practically be eliminated. The new entry card or ticket preferably includes value fields disposed in longitudinal and transverse directions, which makes it further possible to increase the number of fields by a multiple. The thermal cancelling and the supervision of the cancellation by an optical inspection of the entry card makes it possible to dispense with mechanically movable cancellation stamps, cut-off measuring devices and feelers and thereby to simplify the construction of the device and to increase the operational safety thereof. This method of cancellation does not yield any material waste either, which could impair the function of the mechanically movable parts, so that the waste would have to be removed regularly. The use of a reading device makes it also possible to provide the entry card with a code which, for example, identifies the establishment and limits the temporal duration of the card's validity. In this manner, the use of entry cards or tickets in a foreign establishment operating according to the same principle, or the use of an entry ticket or card which has expired in time is prevented. The observation of the cancellation by means of a reading device makes it possible to recognize and reject cards having the correct identification, but which include a region for cancellation which is not thermally cancellable, or to recognize and reject tickets whose thermographic cancellation has been made invisible. The electronic control arrangement finally permits the statistical evaluation of the cancellation processes.

In what follows, several preferred implementation examples of the invention are described with the aid of figures.

DETAILED DESCRIPTION OF THE INVENTION

Figure 1A:
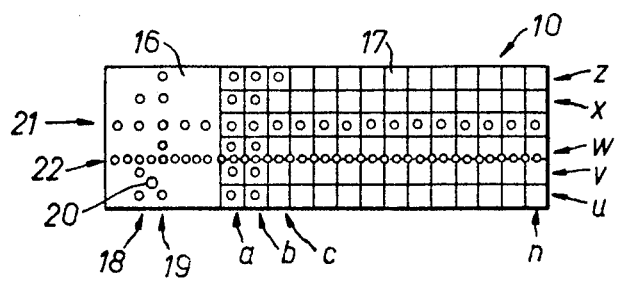
FIG. 1a shows a plan view.
Figure 1B:
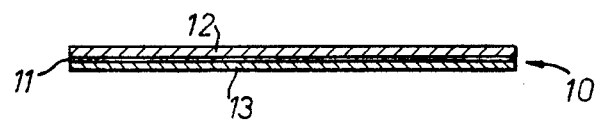
FIG. 1b a cross section through preferred implementation example of the new entry card or ticket. For the sake of clarity, the thickness of the individual layers of the entry card of FIG. 1b are shown considerably enlarged.

The implementation form of an entry card 10, shown in FIGS. 1a and 1b, contains three layers. A central layer 11 of a thermographic material, which can be blackened by a heating device. Materials of this kind are particularly used for photographic copy- and reproduction-methods and are commercially available, for which reason a detailed description is dispensed with. On one side of the central layer, there is disposed a transparent cover layer 13, which protects the thermographic material from mechanical damage such as, for example, wear or abrasion, and which is to make the blackening of the thermographic material visible. On the other side of the central layer there is disposed a layer serving as a mechanical carrier which consists, for example, of thin cardboard or simply of the same transparent material as the protective layer 13.

In that which will be described in what follows, it may be advantageous to insert a transparent thermographic material between two equally transparent protective layers.

In lieu of the thermographic material, it is also possible to use an electrosensitive material, the surface of which may be blackened in precisely predetermined regions due to the action of an electrical voltage or a corona-discharge.

The entry ticket 10 is subdivided into two regions. The first region 16 is provided for coded information 18–19. This information indicates for example, for which establishment an entry ticket is valid and on which day a daily ticket, or until which date a weekly, monthly or season ticket is valid. This information may also indicate, however, how many of the value fields printed on the second region 17 are valid or cancellable, and whether the ticket is provided for adults or children, i.e. whether the canceller should cancel or void the total number of points provided for entry, or to void only a part thereof. If the transfer of the entry ticket to persons other than the purchaser is to be prevented, then one of the information values may consist of an individual number. The apparatus stores this number at each entry of the establishment during a predetermined time, and does not accept this ticket again during that time. The information values may be punched out as holes upon purchase of the entry ticket or may be "inscribed" as dark points into the thermographic material by point-wise heating of the entry ticket. In order to make falsifications of the entry ticket more difficult, the information values may be entered at least partly by means of a fluorescent material, the fluorescence of which cannot be observed during daylight and by means of the human eye.

Finally, in the implementation form shown, there is formed a hole 20 in the first region 16. This hole is "observed" during insertion of the ticket into the device by a light barrier, which light barrier activates the reader for the information values, as will be described later.

The value fields are shown in the second region 17 of the entry ticket illustrated. The implementation example shown in the second region is divided into five columns $u, v, w, x, z$ along the longitudinal direction, and into fourteen lines $a, b, c \ldots n$, disposed in a transverse direction thereto. Each of the fields $az, ax \ldots bz, bx \ldots$ etc. formed in this manner corresponds to a value field. In the example shown the black dots are visible in the value fields of both lines $a, b$ and in the value field $cz$, i.e. these fields have already been cancelled.

The entry ticket illustrated shows additionally two tracks, 21, 22. The track 21 can be used for the transport of the entry ticket into the canceller and simultaneously for the determination of the transport path, i.e. for supervising the position of the ticket in the canceller. In a preferred implementation form of this device, the transport path is supervised in the canceller only by means of the additional track 22, as will be described in what follows.

Figure 2:
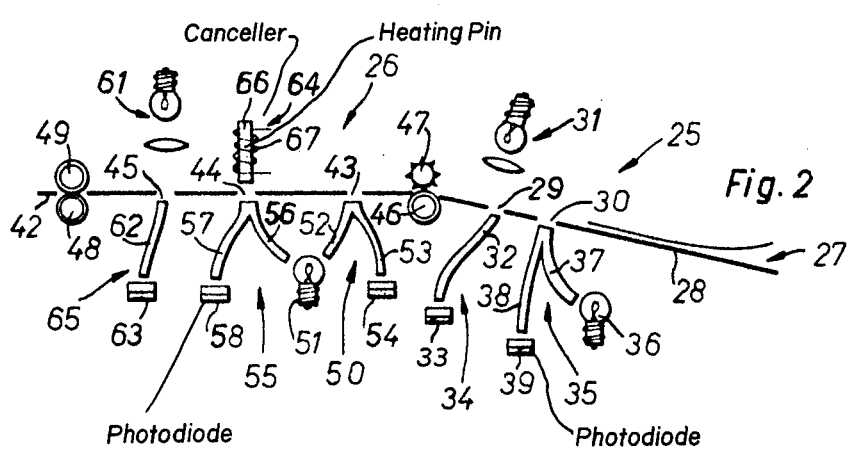
FIG. 2 shows the side view of a preferred implementation example of the device with read-means and the canceller, schematically.

The implementation form of the new device shown schematically in FIG. 2 contains a first part 25 which is provided for reading of the information values in the first region of the entry ticket, and a second part 26, which is provided for determination of the number of the cancellable value fields, and of the number of value fields needed for cancellation to obtain entry to the establishment. The first part 25 is formed with an opening 27, through which a ticket is entered into the device and also contains a slide-rail 28 along which the entry ticket is pushed into the device. The slide-rail is preferably inclined towards the horizontal, so that an entry card not accepted by the device can again be removed therefrom without any difficulty. The slide-rail is formed with a first opening 29 and a plurality of openings 30 (shown successively behind one another in FIG. 2). The number of openings 30 and their distance from one another correspond to the number and disposition of the column in a line of the entry ticket. In the first part of the device there is further provided a light barrier 34 which cooperates with the opening 29. This first light barrier contains an illumination device 31, as well as a light conduit or pipe 32 and a photo diode 33. In the first part of the device there is further disposed a first reader 35. To this first reader there belongs a light source 36, several light conduits or pipes 37 guiding the light of the light source to each of the openings 30, and several light pipes or conduits 38, each of the latter leading from one of the openings 30 to an associated photo diode 39. It should be pointed out that the number of light conduits 38 and the photo diode 39 of the first reader corresponds to the number of columns provided in one line of the entry ticket, so that one reader device or mechanism is associated with each value field of a line. The joint end or common terminal of two respectively associated light conduits 37, 38 is set so close to the slide-rail 28, or cooperates with an optical imaging system, so that the light bundle emanating from the first light conduit has only a small diameter of for example 1 mm. Furthermore, the aperture angle of the other light conduit is so selected that only light reflected from a surface disposed in the immediate vicinity of the entry extremity of the light conduit is received and transmitted further.

It will be understood that a light source 36, the light of which causes a material to fluoresce, must be used for entry tickets of the kind containing fluorescent material-applied information.

The second part 26 of the device shows a preferably horizontal slide-rail 42. Transport devices are provided at the beginning and end of the slide-rail, of which one consists of a roller 46 covered with rubber and a gear wheel 47 cooperating therewith, and the other of two cooperating rollers 48, 49 covered with rubber. Preferably at least one roller of each roller pair is driven by a motor. In a special implementation of the transport device, the gear wheel 47 is employed in order to control the transport path of the entry ticket in the second part of the device, and therefore to regulate the correct positioning of the lines in the second reader or canceller, which will be described later. The slide-rail 42 is formed with an opening 43, and several openings 44 correspond to the columns of a line disposed on the entry ticket, as well as being formed with an additional opening 45. The first opening 43 is associated with a device 50 for determination of the reflection of the material of the entry ticket, the openings 44 are associated with a second reader 55, and the opening 45 is associated with a second light barrier 65. The device for the determination of the reflection, and the second reader cooperate with a common light source 51. The mechanism or device 50 contains a light conduit 52, which guides light from the light source 51 to the opening 43, and a further light conduit 53, which guides the light reflected within the region of the opening 43 to a photo diode 54. The second reader 55 is constructed entirely analogously to the first reader 35, i.e. it contains a plurality of light conduits 56, a respective light conduit 56 leading from the light source 51 to a respective opening 44, and an equal number of light conduits 57, a respective light conduit 57 leading from a respective opening 44 to a photo diode 58. Also the second light barrier 63 is to all intents and purposes constructed equal to the first light barrier 34, and includes on one side of the slide-rail 42 an illumination device 61, and on the opposite side thereof a light conduit 62 which leads to a photo diode 63. A canceller 64 is installed on the side of the slide-rail opposite to that of the second reader 55. This canceller contains as many cancellation elements as there are fields in each line of the entry ticket (in the implementation example shown in FIG. 1, there are five value fields). Each cancellation element consists of a heating pin 66 surrounded by a heating coil 67. The end of each heating pin facing the slide-rail is disposed in the neighborhood of the associated opening 44 so that the end of the oppositely disposed ends of the corresponding light conduit is "seen". The heating pins consist of a material having good heat conductivity, which does not significantly oxidize even when red hot, i.e. at temperatures up to 800° C. Suitable materials are known to every expert. The heating coils can also be heated by current flow, whereby the heat is transformed by radiation and heat conduction of the heat through the heating pin, so that the end thereof facing the slide-track or slide-rail is heated within approximately one second to a temperature between 300° to 400° C. It is, of course, also possible to feed the heating coil by means of a HF-generator, so that eddy currents are generated in the heating pin, the currents heating the pin to the above-named temperature.

It may also be advantageous if hot air nozzles 80, 81 are employed in the canceller 64 in lieu of the heating pins shown. These nozzles are connected through connection conduits 82, 83 to an air pressure source 84, and in each connection conduit there is provided a device for heating the pressurized air passing therethrough. The latter device can also be formed simply as a heating coil 85. The nozzles are formed in such a manner that the jet of the air emerging therefrom has a very small diameter of, for example, only 0.5 mm. The use of hot air has the advantage that any contamination of the entry ticket, and in particular water drops or snow remnants, are blown off prior to the ticket being cancelled.

Figure 3:
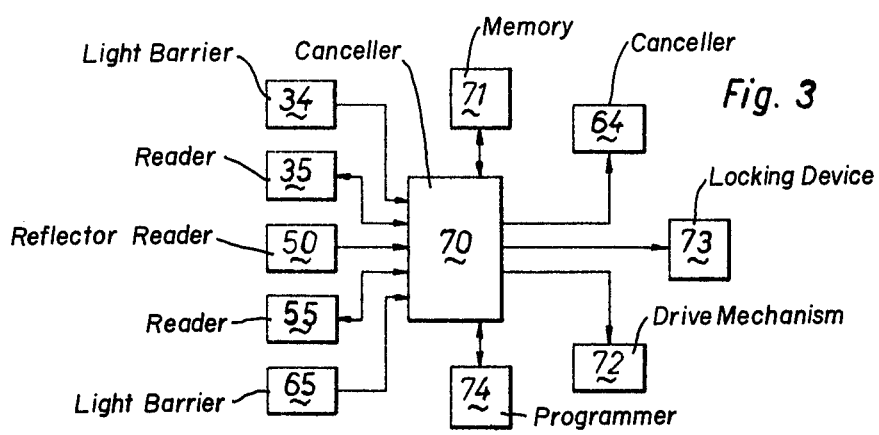
FIG. 3 shows the simplified block diagram of an electronic control circuit which evaluates the signal of the reading device and controls the canceller, the transport mechanism for the entry ticket, and entry to the establishment.
Figure 4:
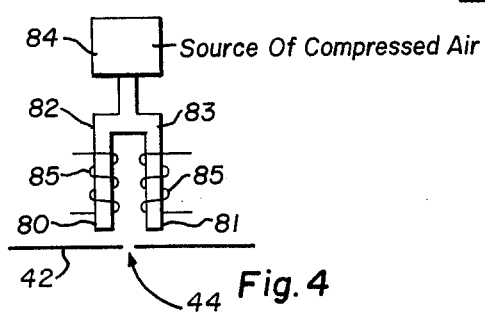
FIG. 4 shows schematically a canceller.

FIG. 3 shows the considerably simplified block schematic of an electronic control circuit, which processes the information or control signal supplied by the heater and the light diode, and controls the drive for the transport mechanism as well as for the canceller. The control mechanism includes a control unit 70, the input of which is connected to the photo diodes 33, 63 of the light barrier 34, 65, to the photo diodes 39, 58 of the readers 35, 55 and to the photo diode 54 of the device 50 for determination of the reflection. The control unit is connected to a memory 71, which stores information values, and the comparison of the latter with the information values contained in the first region 16 of the entry ticket makes it possible to determine the validity of the entry ticket, or the number of the originally valid entry fields, etc. The memory 71 can also be used for a time-limited storage of the above-mentioned individual number of an entry ticket, and also for a short-duration storage of the counted, cancelled or still valid value fields. An output of the control unit 70 is connected to the drive mechanism 72, the latter driving the transport mechanism for the intake and discharge of an entry ticket, and stopping it at the correct location for cancelling, as will still be described. Another output of the control unit is connected to the canceller 64. The signals appearing on that output control which heating pin or heating pins are to be heated and when the heating thereof is to be interrupted. Still another output of the control unit is connected to a locking device 73, for example, a turnstile for unlocking the latter upon reading of the information, or upon cancelling of the required value fields for the entry of a person. The control unit is finally also connected to a programmer 74, which stores amongst others the program which guides the operating steps of the control unit during reading, transport and cancellation of an entry card. Control units of this kind are also known to every expert, so that the special construction thereof is not further discussed here.

It will be understood that the disposition of the light barriers and reading devices shown opposite to one another in FIG. 2 has been selected for an easily understandable grouping thereof in an arbitrary manner, which does not necessarily coincide with the actual disposition thereof. It will be further understood that it is clearly possible to use in lieu of the three light sources shown, only two, or also only one light source. Flexible and optical conduits such as fiber optics, should be used as light conduits.

The sale of entry tickets can be accomplished by an automat, or through a manned cashier's register. An automat is referably provided with keys, the latter being settable as to whether a ticket is desired to be valid for a certain time duration, or a ticket which is to have a set number of cancellable fields, or whether the ticket is to be provided for adults or children, the latter being required to pay only half the price. The automat then applies certain information to the first region 16 of the ticket. An apparatus can be used therefor which operates, or is constructed similarly to that of the canceller 64 of the device. It is also possible, however, to form an individual element of the coded information by punched-out holes. An appropriate device for entering of the information can, of course, also be used in a manned cashier's register.

In order to obtain entry to an establishment provided, for example with a turnstile, the entry ticket is inserted into the opening 27 of the device located next to the turnstile. The ticket is then iserted into the device on the slide-rail until its leading edge comes into the region of the first transport device 46, 47. The rollers of the transport device are normally driven in a direction, in which an inserted card is not gripped or inserted, but rejected. As soon as the hole 20 of the ticket appears in the region of the first light barrier 34 during insertion of the entry card, the photo diode 33 is illuminated through this hole by the illumination device 31, and generates an output signal, the latter being fed to the control unit 70. The control unit then activates the first reader 35, which reads out at the same time the information appearing on the openings 40. The portion of the entry ticket disposed above the openings is then illuminated by the light guided from the light source 36 through the light conduit 37 for reading of the latter information. If no sign or character occurs in this location, then the light is reflected according to the reflection property of the central layer of the entry card and passed through the light conduit 38 to the photo diode 39. The photo diode then generates an output signal corresponding to the intensity of the illumination. If a sign or character is disposed on the illuminated location of the ticket, for example, a darkly colored point or a punched-out hole, then little or no light is reflected and the photo diode is illuminated little or not at all. The output signal of the photo diode is then very small or equal to zero. It is understood that upon the use of fluorescent signs or characters the output signal of the photo diode will be large if a sign or character is excited by the impinging light, while a pure reflection of the light from the central layer causes only a small output signal or none at all. It will be further understood that it is possible to impart the information by means of a material which does not for example, reflect any infrared light. For "reading" of such information, the light source 36 may simply be replaced by a Ga-As-diode, which emits primarily infrared light. For the reading of information which is distributed over a plurality of lines (for example the lines 18, 19), openings 30 can be provided on the guide-rail 28 which are distributed over several lines, and a reading device can be associated with each of the openings. The read information is then passed back to the control unit and compared with the information stored in the memory 71. If the information shows that the inserted card is a daily, weekly or season ticket, and if it is determined by comparison with the contents of the memory that its validity has not yet expired, then the control unit generates a control signal for the lock-out device 73, the latter then unlocking the turnstile for the passage of one person. The entry ticket is at the same time returned through the opening 27. If the information shows that the entry ticket is not transferrable, then the control unit examines first whether the individual number of the card is stored in the memory 71. If the number is not stored, then it is transferred to the memory for a limited tolerance-time and the lock-out device is unlocked. If the number is still stored, then the device returns the ticket without permitting entry to the establishment. If cards are inserted into the device, the validity of which has expired, then the control unit activates the drive device for the transportation means in such a manner that the invalid ticket is drawn into the device and transported via the read- and cancellation portion into a non-illustrated collection container.

If the information indicates that the entry ticket or card disposed in the first part of the device is a ticket cancellable by points, then the drive mechanism 72 is regulated by the control unit and causes the direction of rotation of the rollers or of the roller and the gear wheel of the transport mechanism 46, 47 to be reversed, and the ticket to be drawn into the second portion 26 of the device.

Upon entrance of the ticket into the second portion of the device, the reflection of an unmarked portion of the entry ticket is first of all determined with the aid of the device 50. For this purpose that portion is illuminated by the light source 51 with the aid of the light conduit 52 through the opening 43 in the slide-rail 42, and the reflected light is guided by the light conduit 53 to the photo diode 54. The output signal of the photo diode is transmitted to the control unit 70. If the reflection of the unmarked portion of the entry ticket is only small, because, for example, the central layer has been fabricated of a material reflecting only slightly, or if the latter has become darkened subsequently, then the control unit increases the sensitivity of the reader 55, or amplifies the signal supplied by the reader. If, on the other hand, the reflection from the entry ticket is very large, then the control unit decreases the sensitivity of the reader, or the amplification of the signl supplied by the reader.

The entrance of the entry card into the second portion of the device is supervised. The gear wheel 47 can simply be utilized therefor, the teeth of the latter engaging with the holes of the first track 21. The gear wheel is driven by a (non-illustrated) stepping motor, and the impulses used for driving the motor are counted by the control unit and compared with a predetermined number of impulses stored in the memory. The advance of the ticket in the device can, however, also be supervised with the aid of the second light barrier 65, which counts the holes of the second track 22. The photo diode 63 supplies an output signal for each hole of the track guided over the opening 45. The number of these output signals is compared with numbers which are stored in the memory 71, and permits a determination which line of the second region of the entry ticket is disposed over the openings 44 of the slide-rail, or whether the value fields of this line have the desired orientation or alignment with respect to this opening. By means of this second mode of operation errors can be avoided which are caused, for example, by a slippage between the entry ticket and the drive mechanism.

As soon as it has been determined by the count of the drive impulses of the stepping motor of the drive mechanism, or by the signals generated by the second track 22, that the fields of the first line *a* are disposed over the openings 44, the control unit 70 activates the second reader 50. For this purpose, the individual value fields of this line are illuminated by the associated light conduit 56, and the light reflected from each value field is guided by the associated light conduit 57 to its corresponding photo diode 58. Since valid value fields yield a stronger reflection than already cancelled fields, the control unit can determine whether, or which fields of the first line are still valid. It will be understood that the second reader may read not only blackened fields, but also fields cancelled by hole punching, or by means of a punch. It is therefore possible to release a second entrance to the establishment without any difficulty in the event of a strong public pressure, in addition to the release of the automatic device, the entry ticket being manually cancellable by the former. Upon reading of the value fields, and in coincidence with the required number of value fields neeeded for admission to an establishment, and the pre-read information (for example, tickets for a child), the cancellation program is recalled from the programmer 74. One or several cancellation devices disposed over still uncancelled fields are excited for cancellation. For this purpose, the associated heating pin 66, as has already been described, is heated by current flow in the heating coil 67, and the portion of the thermographic material adjoining the lower end of the heating pin is blackened by the heat. The second reader 55 remains switched on during cancellation, and the signal generated by the photo diodes 58 corresponds to the increasing blackening of the "observed" value fields. As soon as the blackening and the corresponding signal have reached a predetermined value, the associated heating device is switched off. It is possible to generate very uniform cancellation markings in this manner, even if the temperature-dependent blackening of the thermographic material on the whole surface is not constant, or if the heating of the material by the individual heating pins is not uniform. In order to improve the uniform blackening during cancellation, the sensitivity of a second reader 55, which is relatively large during reading, is reduced during the supervision of the cancellation process.

If more fields have to be cancelled for admission or entry into an establishment than are available in one line, or are still available, then the still-valid fields of that line are first cancelled, the entry ticket is then transported through one line distance, and the still required fields are cancelled. Upon cancellation of the number of value fields required for admission to the establishment, the drive device 72 which drives the transport mechanism in the opposite direction is controlled so that the ticket is returned again through the opening 27. Concurrently a control signal is generated for the lock-out mechanism 73 which releases the turnstile for the admission of one person.

If an admission ticket does not include as many valid fields as are required for admission to an establishment, then the still valid value fields are cancelled in the first operation, and their number is stored in the memory 71. Upon insertion of a further entry ticket only as many value fields are cancelled thereon as correspond to the difference between the required and the previously cancelled and stored fields.

If an entry ticket has been completely cancelled, then the drive mechanism is controlled so that the ticket is no longer returned, but transported into a container provided therefor.

As has been described above, the reading and cancellation of the fields is accomplished in a predetermined sequence. For example, initially the fields of the line a are in the columns u to x, and subsequently the fields in the line b are also read in the columns u to x and then cancelled, etc. In a preferred implementation form of the device, the programmer 74 is so adjusted that the reader at first reads only the value fields in the column z. As long as the reader finds fields cancelled in the column z, the entry card is transported further. Only when the reader finds the first non-cancelled field in the column z is the transport of the entry ticket interrupted, and all fields are read in the corresponding line starting with the field of the coulmn u. The cancellation then commences on the first not yet cancelled field in the sequence already described above. This method of reading permits the reading of entry cards with many cancelled fields more rapidly than according to the first-described program. It also permits the avoidance of reading errors due to poorly readable markings. During manual cancellation of several fields this method of reading also permits one to dispense with the individual cancellation of each individual field, and to cancel only the field terminating the line (or fields terminating successive lines) in the column z, or if necessary, additional fields starting with the field in column u.

It has already been mentioned that it is also possible to use entry tickets having a transparent thermographic material. Such entry tickets permit a simpler construction of the device, and in particular of the second reader 55. When using the transparent thermographic material, it is not necessary to measure the blackening of a value field by means of reflected light, but the light radiated by the faintly glowing heat pin 66 can be observed. It will be understood that the heating pins are heated only a little for reading, in order not to blacken the thermographic layer unintentionally, the heating pins being only heated to a suitable temperature upon cancellation for the blackening of the layer.

I claim:

1. An access control system for selectively controlling entry to an establishment comprising an entry card and a device for scanning said entry card and determining access to the establishment, said entry card including at least a first region having machine-readable information applied prior to issue of the card and a second region having at least one cancellable value field, said field intended to be cancelled before releasing entry to the establishment, a canceller for cancelling said field, said device including at least a first reader provided for the reading of said information, and a second reader for reading the condition of said value field, and means responsive to the read information and the read condition for determination of the validity of the card, for activating said canceller and for releasing entry to the establishment if said information coincides with a predetermined comparison value, said validity determination indicating at least one non-cancelled value field and said canceller functioning to cancel said non-cancelled value field.

2. A system according to claim 1, wherein said second reader includes at least one light source provided for the illumination of a small region of the entry card and an associated light receiver for receiving of the reflected light from the illuminated region of the entry card.

3. A system according to claim 2, wherein the canceller and the second reader are disposed so that the cancelling of the at least one value field (a,z) is readable on the thermographic material by the second reader, and herein said means is responsive to the signal generated by the second reader to control the canceller.

4. A system according to claim 2, wherein the further region of the entry card, includes a plurality of value fields (a,z . . . n,u) disposed in the longitudinal and transverse directions of the card, and wherein the second reader includes a plurality of light sources disposed transversely with respect to the transport direction of the entry card for illumination of a small region, and a plurality of light receivers provided for receiving the reflected light of the small illuminated regions.

5. A system according to claim 1, wherein the entry card includes a marking disposed in a predetermined position with respect to the information and the device includes a third reader provided for the reading of this marking which releases a control signal upon reading of that marking, the latter activating the first reader for reading of the information.

6. A system according to claim 5, wherein the marking on the entry card is formed as a hole, and the third reader is a light barrier.

7. A system according to claim 1, wherein the information is contained in an area having only a small optical reflection, and wherein the first reader includes at least one light source for the illumination of a small region of the entry card and an associated light receiver for receiving the reflected light from the illuminated small region.

8. A system according to claim 1 wherein the entry card includes at least in the region provided for the at least one cancellable value field, a thermographic material.

9. A system according to claim 1, wherein the canceller includes a heating means for thermally blackening a dot in the thermographic material when cancelling a cancellable value field.

10. A system according to claim 9 wherein the heating means is a heatable pin disposed in the canceller in the vicinity of the track of the entry card.

11. A system according to claim 9 wherein the heating means includes a nozzle for a gaseous medium, and means are provided to heat the gaseous medium, and direct a jet of heated gaseous medium onto a predetermined small region of the entry card.

12. A system according to claim 1, wherein the entry card includes at least in the region provided for the at least one cancellable value field, an electrosensitive material.

13. A system according to claim 1, wherein the device includes a mechanism for the determination of the reflection of the material of the entry card in the second region, the mechanism including a light source and a light receiver for receiving of the light reflected from the region of the entry card illuminated by the light source, and wherein the said means is also responsive to the signal generated by the light receiver to control of the sensitivity of the second reader.

14. A system according to claim 1, wherein the means responsive to the read information and condition adjusts the second reader for the determination of the validity of the at least one value field (a,z) to a greater sensitivity than for the control of the canceller.

15. A system according to claim 1, wherein the said means controls the second reader so that the latter initially reads only the value fields (au . . . nu) in a column (u) disposed on the longitudinal edge of the entry card and only reads the additional fields (cv . . . cx) of the associated line (c) upon reading of the first, non-cancelled field (cu).

16. A system according to claim 1, wherein the said means is associated with a memory and wherein the said means controls the canceller for the cancellation of all of the uncancelled value fields, if more value fields are to be cancelled for admission to the establishment than are available as non-cancelled fields (cx . . . nu) on the entry card and at the same time storing the difference of the number of the value fields to be cancelled for admission and the number of the just cancelled value fields in the memory, and controls the canceller for cancellation of a number of value fields corresponding to said difference upon an additional entry card having been inserted into this device.

17. An access control system for selectively controlling entry to an establishment comprising an entry card and a device for scanning said entry card and determining access to the establishment, said entry card including at least a first region having machine-readable information applied prior to issue of the card and a second region having at least one cancellable value field, said field intended to be cancelled before releasing entry to the establishment, a canceller for cancelling said field, said device including at least a first reader provided for the reading of said information, and a second reader for reading the condition of said value field, and means responsive to the read information and the read condition for determination of the validity of the card, for activating said canceller and for releasing entry to the establishment if said information coincides with a predetermined comparison value, said validity determination indicating at least one non-cancelled value field and said canceller functioning to cancel said non-cancelled value field, wherein the information in said first region of the entry card includes a running variable, and said control means is connected with a memory into which the read running variable is stored during a predetermined time interval enabling the device to reject an entry card used twice during said predetermined time interval.

18. A method for controlling the entry to an establishment employing an entry card and a device for use in cooperation therewith comprising the steps of:
  applying machine-readable information in at least a first region on an entry card and a cancellable value field in a second region on an entry card;
  inserting a predetermined value in a device for reading an entry card for later comparison;
  inserting said card in said reading device;
  examining the information in said first region and the value field in said region which is read from said card; and
  releasing entry to an establishment when the examined information coincides with said predetermined value and when said card indicates at least one non-cancelled value field.

19. The method of claim 18 including the further step of cancelling said value field.

* * * * *